US012303078B2

(12) United States Patent
Rodriguez et al.

(10) Patent No.: US 12,303,078 B2
(45) Date of Patent: May 20, 2025

(54) DISSOLVABLE TOILET BRUSH FORMULATIONS HAVING BENEFICIAL RATIOS OF SOAP TO SURFACTANT

(71) Applicant: Henkel AG & Co. KGaA, Duesseldorf (DE)

(72) Inventors: Christopher Michael Rodriguez, Brewster, NY (US); Daniel Thomas Piorkowski, Fairfield, CT (US); Juan Salas, Norwalk, CT (US); John Daniel Konikowski, Middletown, CT (US)

(73) Assignee: Henkel AG & Co. KGaA, Duesseldorf (DE)

(*) Notice: Subject to any disclaimer, the term of this patent is extended or adjusted under 35 U.S.C. 154(b) by 300 days.

(21) Appl. No.: 18/050,541

(22) Filed: Oct. 28, 2022

(65) Prior Publication Data

US 2024/0138633 A1 May 2, 2024

(51) Int. Cl.

| | |
|---|---|
| ***C11D 1/00*** | (2006.01) |
| ***A47K 11/10*** | (2006.01) |
| ***C11D 1/28*** | (2006.01) |
| ***C11D 3/00*** | (2006.01) |
| ***C11D 3/10*** | (2006.01) |
| ***C11D 3/20*** | (2006.01) |
| ***C11D 17/04*** | (2006.01) |

(52) U.S. Cl.

CPC ................ *A47K 11/10* (2013.01); *C11D 1/28* (2013.01); *C11D 3/0047* (2013.01); *C11D 3/10* (2013.01); *C11D 3/2082* (2013.01); *C11D 17/044* (2013.01)

(58) Field of Classification Search

CPC ........................ C11D 17/0073; C11D 17/0056

See application file for complete search history.

(56) References Cited

U.S. PATENT DOCUMENTS

| | | | |
|---|---|---|---|
| 2,755,497 | A | 7/1956 | Greacen, Jr. |
| 4,031,673 | A | 6/1977 | Hagelberg |
| 4,493,124 | A | 1/1985 | Agapiou |
| 4,642,836 | A | 2/1987 | Bokmiller |
| 4,852,201 | A | 8/1989 | Wundrock et al. |
| 5,471,697 | A | 12/1995 | Daconta |
| 5,630,243 | A | 5/1997 | Federico et al. |
| 5,888,002 | A | 3/1999 | Fenstersheib |
| 6,094,771 | A | 8/2000 | Egolf et al. |

(Continued)

FOREIGN PATENT DOCUMENTS

| | | | |
|---|---|---|---|
| EP | 1553864 | B1 | 10/2008 |
| ES | 2622227 | T3 | 7/2017 |

(Continued)

*Primary Examiner* — Necholus Ogden, Jr.

(74) *Attorney, Agent, or Firm* — Bojuan Deng

(57) ABSTRACT

Compositions are provided for dissolvable solid unit dose formulations that can be used with a wand apparatus to clean a toilet surface. The formulations include anionic surfactant, a carbonate or bicarbonate salt, an organic acid, and virgin soap pellets wherein a ratio of the virgin soap pellets to the surfactant is from about 0.5:1 to about 2:1, preferably about 1:1 to about 1.5:1, and most preferably about 1.2:1 to 1.3:1. Compressed compositions retain sufficient hardness to facilitate cleaning a toilet surface but are still able to have a time to breakage when submerged in toilet water of less than 5 minutes to enable easy disposal by flushing with toilet water.

5 Claims, 2 Drawing Sheets

(56) References Cited

U.S. PATENT DOCUMENTS

| | | | | |
|---|---|---|---|---|
| 6,463,620 | B2 | 10/2002 | Busha | |
| 6,939,841 | B2 | 9/2005 | Requejo | |
| 7,065,825 | B2 | 6/2006 | Minkler et al. | |
| 7,127,768 | B2 | 10/2006 | Blum et al. | |
| 7,146,676 | B2 | 12/2006 | Kubes et al. | |
| 7,159,265 | B2 | 1/2007 | Soller et al. | |
| 7,232,364 | B2 | 6/2007 | Hibbard | |
| 7,275,276 | B2 | 10/2007 | Jaszenovics et al. | |
| 7,530,138 | B1 | 5/2009 | Platt | |
| 7,563,756 | B2 | 7/2009 | Brady | |
| 7,650,663 | B2 | 1/2010 | Michaels et al. | |
| 7,827,648 | B2 | 11/2010 | Soller et al. | |
| 9,408,521 | B2 | 8/2016 | Molinet et al. | |
| 2002/0061831 | A1 * | 5/2002 | Kaziska | C11D 3/48 510/446 |
| 2003/0040459 | A1 * | 2/2003 | Araya | C11D 3/124 510/507 |
| 2007/0079460 | A1 | 4/2007 | Tapp et al. | |
| 2013/0104304 | A1 | 5/2013 | Wilson et al. | |
| 2016/0106274 | A1 | 4/2016 | Eun | |
| 2018/0296043 | A1 | 10/2018 | Meier et al. | |
| 2021/0052117 | A1 * | 2/2021 | O'Brien | A47K 11/10 |

FOREIGN PATENT DOCUMENTS

| | | | | |
|---|---|---|---|---|
| GB | 738299 | A | 10/1955 | |
| GB | 2242130 | A | 9/1991 | |
| GB | 2329325 | A | 3/1999 | |
| WO | 0149818 | A1 | 7/2001 | |
| WO | WO-2005061689 | A1 * | 7/2005 | C11D 17/0073 |
| WO | 2014039356 | A1 | 3/2014 | |

* cited by examiner

DISSOLVABLE TOILET BRUSH FORMULATIONS HAVING BENEFICIAL RATIOS OF SOAP TO SURFACTANT

FIELD OF THE INVENTION

The present invention is in the field of household and industrial cleaning in applications for cleaning toilets. The present invention relates to dissolvable unit dose formulations that can be used with a wand for manually cleaning toilets.

BACKGROUND OF THE INVENTION

Toilet brushes are typically used to swirl cleaning chemicals around a toilet bowl and then to scrub the sides of the bowl with those chemicals and water, so as to assist in removing stains along the bowl sides. After using such brushes, a consumer will typically attempt to rinse off the brush by swirling it in the bowl water. However, cleaning chemicals, feces, urine, and stray bits of paper typically found in the toilet can be retained on the brush or in its holder.

Numerous mechanical devices have been proposed to overcome disadvantages of a toilet brush having a permanently affixed head. Several commercially available products include a removable head that must be thrown away in the trash. For instance, US Patent Application Publication No. 2016/0106274 discloses a non-woven cleaning fabric layer comprising a cleaning composition, and a functional non-woven fabric layer comprising a functional composition. The cleaning composition comprises an anionic surfactant, an ethanolamine-based compound, a pigment, a dye, or a mixture thereof, and a solvent. The functional composition comprises a functional polymer and one or more surfactant.

GB 738,299 discloses a toilet cleaning device where the head is slipped into a swab and a toilet is then cleaned by wiping the swab around the surface of the bowl of the toilet. Removal of the swab is achieved by shouldering the swab against the rim of a toilet bowl and pulling the holder away to cause the swab to slip off, into the bowl, and dissolve prior to being flushed away. Other flushable and replaceable brush head elements are disclosed in e.g., U.S. Pat. Nos. 2,755,497, 4,031,673, 5,630,243, and 6,094,771 and GB 2,329,325.

U.S. Pat. No. 7,650,663 discloses flushable heads that are insertable in a permanent type of wand. The brush head may be a stack of sheets of water-dissolvable material. The sheets are compressed to bind them together into a stack. Surface indentations and piercing of layers at the indentations are used to bind the brush head layers together securely without the need for binding adhesives, and to facilitate clamping. The heads releasable from the wand and are said to break up and behave like toilet paper, so they are flushable after use.

However, flushable heads, such as those disclosed in U.S. Pat. No. 7,650,663 are water degradable, as opposed to dissolvable. Thus, oftentimes consumers will opt to discard these heads in their garbage for fear of clogging their toilets as flushable heads take longer to break up and/or have the tendency to degrade incompletely.

Water solubility (as opposed to degradability) is a desirable feature for a toilet cleaning "brush" because it allows the head to be flushed immediately after use, thereby avoiding the need to transport the dripping head to a garbage can, and avoiding any odors that may develop if the brush head were left in a garbage can for some time period after use. It also avoids the potential for clogging that can occur when ingredients of a pad dissolve incompletely and/or take a long time to break up.

U.S. Pat. No. 5,471,697 discloses a toilet cleaning device that has a cleaning head in the shape of a foot. This head is able to clean underneath the rim of the toilet. However, a user has to continually rotate the device as they clean underneath the rim which involves two hands. This is inconvenient and it also causes one of the hands to be closer to the bowl which may have germs. The disposable feet are made from enzyme-coated biodegradable polymer particles, acrylic polymers, vinyl polymers or copolymers containing acid groups, sodium propionate or polyethylene glycol; thus, they are expensive and may take considerable time to dissolve. Furthermore, in order to remove the head from the shaft, the shaft has to be left in the toilet bowl while the head dissolves. This renders the toilet unusable during that period.

WO 2014/039356A1 discloses dissolvable unit doses with an applicator for cleaning toilets but provides no details on a suitable cleaning formulation for the dissolvable unit dose.

There is a need for improved toilet "brush" head formulations. In particular, there is a need for solid unit dose cleaning compositions that can be attached to a wand apparatus to mechanically clean a toilet bowl surface and that are dissolvable in toilet water after they are used to clean the bowl.

It is an object of the invention to provide a dissolvable toilet brush product that has a good dissolution rate, a strong structural integrity (so it does not crack during shipment or while in use), provides good foaming (an indication of cleaning efficacy), and is resistant to significant humidity abuse.

SUMMARY OF THE INVENTION

It has been unexpectedly discovered that certain soap to surfactant ratios of a dissolvable toilet brush composition provide an improved product which has both a rapid dissolution and a structural integrity during use. Compressed compositions retain sufficient hardness to facilitate cleaning a toilet surface but are still able to have a time to breakage when submerged in toilet water of less than 5 minutes to enable easy disposal by flushing with toilet water.

Dissolvable solid unit dose formulations e.g., compressed tablets, that can be used with a wand apparatus to clean a toilet surface are described herein. The unit doses can be removably attached to the cleaning wand. The dissolvable formulations alleviate fear of flushing solid material and enable the consumer to clean the toilet and then see the solid dissolve during/after use. The formulations include surfactants, an organic acid, an organic acid buffering agent, and virgin soap pellets wherein a ratio of virgin soap pellets to anionic surfactant is from about 0.5:1 to about 2:1. In especially preferred embodiments, the ratio of virgin soap pellets to surfactant is from about 1:1 to about 1.5:1, more preferably about 1.2:1 to 1.3:1.

The virgin soap pellets typically comprise about 5% to about 50% by weight of the cleaning composition, more preferably about 8% to about 30%, most preferably about 12% to about 20% by weight of the composition.

In certain embodiments, the virgin soap pellets comprise about 55% to about 90% by weight of a soap mixture, about 0.5% to 5% by weight free fatty acids, glycerin, and one or more chelating agents or stabilizers and the soap mixture will preferably comprise monovalent salts of tallow and palm kernel fatty acids. In some embodiments, the virgin soap pellets comprise about 8% to about 15% by weight of sodium stearate and/or about 15% to about 22% by weight sodium palmitate.

In one embodiment, a solid unit dose toilet cleaning composition includes an anionic surfactant, an organic acid, a carbonate or bicarbonate salt, and virgin soap pellets, a ratio of the virgin soap pellets to the anionic surfactant is from about 0.5:1 to about 2:1, more preferably about 1:1 to about 1.5:1, most preferably about 1.2:1 to about 1.3:1. Advantageously, the unit dose breaks apart in less than 5 minutes when submerged in toilet water enabling a product that can be used as a toilet brush when attached to a wand member without creating potential blockage problems in the plumbing or sewage systems.

The anionic surfactant is preferably selected from Sodium Dodecylbenzenesulfonate, Sodium Cocoyl Isethionate, Sodium Olefin Sulphonate, and combinations thereof. In certain preferred embodiments, the anionic surfactant consists of an alpha olefin sulfate, such as Sodium Olefin Sulphonate.

In some embodiments, the anionic surfactant is present at about 5% to about 50% by weight of the composition, more preferably about 10% to about 30% by weight of the composition, most preferably about 12% to about 20% by weight of the composition.

In certain embodiments, the organic acid comprises about 1% to about 30% by weight of the cleaning composition, and is selected from the group consisting of glycolic, malic, lactic, citric acid, and salts and combinations thereof. In certain of those embodiments, the acid consists of glycolic acid or citric acid. In preferred compositions, the organic acid is citric acid.

In certain embodiments, the organic acid buffering agent comprises a carbonate or bicarbonate salt and/or trisodium citrate. In some of those embodiments, the buffering agent consists of a carbonate or bicarbonate salt, such as sodium bicarbonate.

In some preferred compositions, the composition comprises about 10% to about 40% by weight of a citric acid buffering agent, such as sodium bicarbonate.

It other preferred compositions, the amount of organic acid and organic acid buffering agent is an amount sufficient to provide the composition with a pH of greater than 4.6 when dissolved in toilet water.

In some embodiments, the composition further comprises a water-soluble filler selected from the group consisting of clays, sugars, salts, celluloses, and combinations thereof. Preferably, the filler includes water-soluble inert salt which comprises or consists of an inorganic alkali metal salt, such as sodium chloride.

In certain embodiments having a cellulose filler, the cellulose filler comprises or consists of microcrystalline cellulose (referred to hereafter as "MCC").

In some embodiments, the filler consists of a water-soluble inert salt, such as sodium chloride.

In certain embodiments the filler consists of clay, such as bentonite clay, and salt, such as sodium chloride.

In some embodiments the filler consists of microcrystalline cellulose and salt, such as sodium chloride.

Preferably, the composition has a pH greater than 4.6, more preferably about 5.5 to about 6.5, when dissolved in toilet water.

In certain embodiments, the composition further comprises a binder, a fragrance, and a dye.

In some embodiments, the composition comprises about 1% to about 7% of a binder, preferably corn starch or hypromellose.

In certain preferred embodiments, the composition consists essentially of or consists of anionic surfactant, water-soluble salt, clay or microcrystalline cellulose, organic acid, organic acid buffering agent, virgin soap pellets, binder, and lubricant/glidant. In some of those embodiments, the composition consists essentially of or consists of anionic surfactant, sodium chloride, bentonite clay, citric acid, sodium bicarbonate, virgin soap pellets, binder, and lubricant/glidant.

In some preferred embodiments, the composition consists essentially of or consists of anionic surfactant, water-soluble salt, organic acid, organic acid buffering agent, virgin soap pellets, binder, fragrance, and dye. In some of those embodiments, the composition consists essentially of or consists of anionic surfactant, sodium chloride, citric acid, sodium bicarbonate, virgin soap pellets, corn starch, fragrance, and dye.

In other preferred embodiments, the composition consists of anionic surfactant, water-soluble salt, organic acid, organic acid buffering agent, virgin soap pellets, borax, binder, fragrance, and dye. In some of those embodiments, the composition consists essentially of or consists of anionic surfactant, sodium chloride, citric acid, sodium bicarbonate, virgin soap pellets, borax, corn starch, fragrance, and dye.

In one embodiment, a compressed toilet brush composition consists essentially of:

- about 10% to about 25% by weight anionic surfactant;
- about 10% to about 20% by weight citric acid;
- about 10% to about 40% by weight of a citric acid buffering agent;
- about 4% to about 50% by weight filler;
- about 7% to about 47% by weight virgin soap pellets;
- about 3% to about 5% binder; and
- at least one of a lubricant, glidant, dye, and fragrance.

In preferred embodiments, a ratio of soap to surfactant is about 1.2:1 to about 1.3 to 1.

The compositions disclosed herein are preferably compressed solids that weigh about 25 to about 45 grams and has a hardness of 15 N or greater than 15 N, and has an indentation in at least one of its surfaces that is adapted to receive and engage a wand.

In preferred embodiments, a unit dose comprises an indentation in at least one of its surfaces that is adapted to receive and engage a wand.

In some embodiments, the unit dose is a tablet or puck having a top surface, a bottom surface, and a height extending from the top surface to the bottom surface, the top surface having an indentation from 25% to 100% of the height of the solid that is adapted to receive and engage with a wand member.

The puck or tablet can be provided in a package with the wand member. In certain embodiments, a plurality of the pucks or tablets is contained in a sealed package, which may or may not include a wand member that is adapted to receive and engage with the puck/tablet.

DETAILED DESCRIPTION OF THE INVENTION

Figure 1:
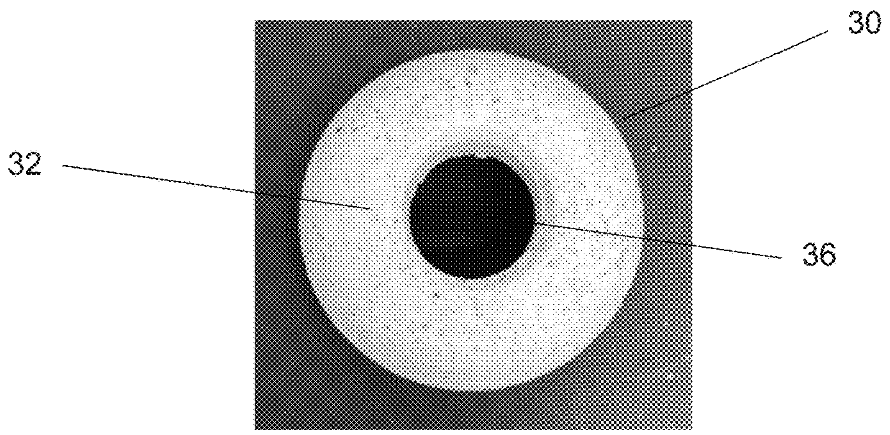
FIG. 1 is a photograph illustrating a top view of a solid unit dose toilet cleaning composition of the present invention that can be releasably attached to a wand.

The following detailed description is merely exemplary in nature and is not intended to limit the compositions or the methods for producing or using the same. Furthermore, there is no intention to be bound by any theory presented in the preceding background or the following detailed description.

Except in the operating and comparative examples, or where otherwise explicitly indicated, all numbers in this description indicating amounts or ratios of material or conditions of reaction, physical properties of materials and/or use are to be understood as modified by the word "about".

The term "about" as used in connection with a numerical value throughout the specification and the claims denotes an interval of accuracy, familiar and acceptable to a person skilled in the art. In general, such interval of accuracy is +−10%. Thus, "about ten" means 9 to 11. All numbers in this description indicating amounts, ratios of materials, physical properties of materials, and/or use are to be understood as modified by the word "about," except as otherwise explicitly indicated.

Weight percent, percent by weight, wt %, wt-%, % by weight, and the like are synonyms that refer to the concentration of a substance as the weight of that substance divided by the weight of the composition and multiplied by 100. As used in this application, the term "wt. %" refers to the weight percent of the indicated component relative to the total weight of the solid cleaning composition, unless indicated differently. The weight percentage of an individual component does not include any water supplied with that component, even if the component is supplied as an aqueous solution or in a liquid premix, unless otherwise specified.

The recitation of numerical ranges by endpoints includes all numbers within that range (e.g. 1 to 5 includes 1, 1.5, 2, 2.75, 3, 3.80, 4, and 5).

Provided herein are dissolvable solid unit dose toilet cleaning compositions, which are typically produced in the form of compressed solids or tablets comprising several components: an anionic surfactant, an organic acid and an organic acid buffer, and virgin soap pellets or a cellulose or a combination thereof. The solid products can be used with a releasably connected wand or handle as a toilet brush. The unit doses are capable of dissolving in water in a short amount of time so that they can be flushed down the toilet after use.

"Cleaning" means to perform or aid in soil removal, bleaching, microbial population reduction, or combination thereof.

As used herein, the term "comprising" means including, made up of, composed, characterized by, or having.

As used herein, the term "brush" means an implement with a handle and including of a solid member at one end that can be used for cleaning, scrubbing, applying a liquid or powder to a surface. The solid member of the brush may be referred to as a "head."

As used herein, a "solid cleaning composition" refers to a cleaning composition in the form of a solid for example, a granule, a pellet, a tablet, a lozenge, a puck, a briquette, a brick, a solid block, or a unit dose. The term "solid" refers to the state of the detergent composition under the expected conditions of storage and use of the solid detergent composition. In general, it is expected that the cleaning composition will remain in solid form when exposed to temperatures of up to about 100° F. and greater than about 120° F.

A "stable solid" composition refers to a solid that retains its shape under conditions in which the composition may be stored or handled.

A solid unit dose refers to a cleaning composition unit sized so that the entire unit is used during a single cleaning cycle. When the solid cleaning composition is provided as a unit dose, it is preferably provided as a compressed solid, such as a tablet having a size of between about 1 gram and about 50 grams. Furthermore, it should be appreciated that the solid cleaning composition can be provided so that a plurality of the solids will be available in a package having a size of between about 40 grams and about 1,000 grams.

The solid head may be in various compressed, cast, or extruded forms including, for example, pellets, blocks, and tablets, but not powders.

The present invention also provides methods of production of such compositions, and methods of use of such compositions in processes for cleaning toilets by introducing one of the unit dose products into a toilet bowl, whereby the cleaning system is released such that it comes into contact with a soiled toilet bowl under conditions for the removal of one or more soils from the toilet bowl. The unit doses dissolve in toilet water after they are used to clean the bowl.

Figure 2:
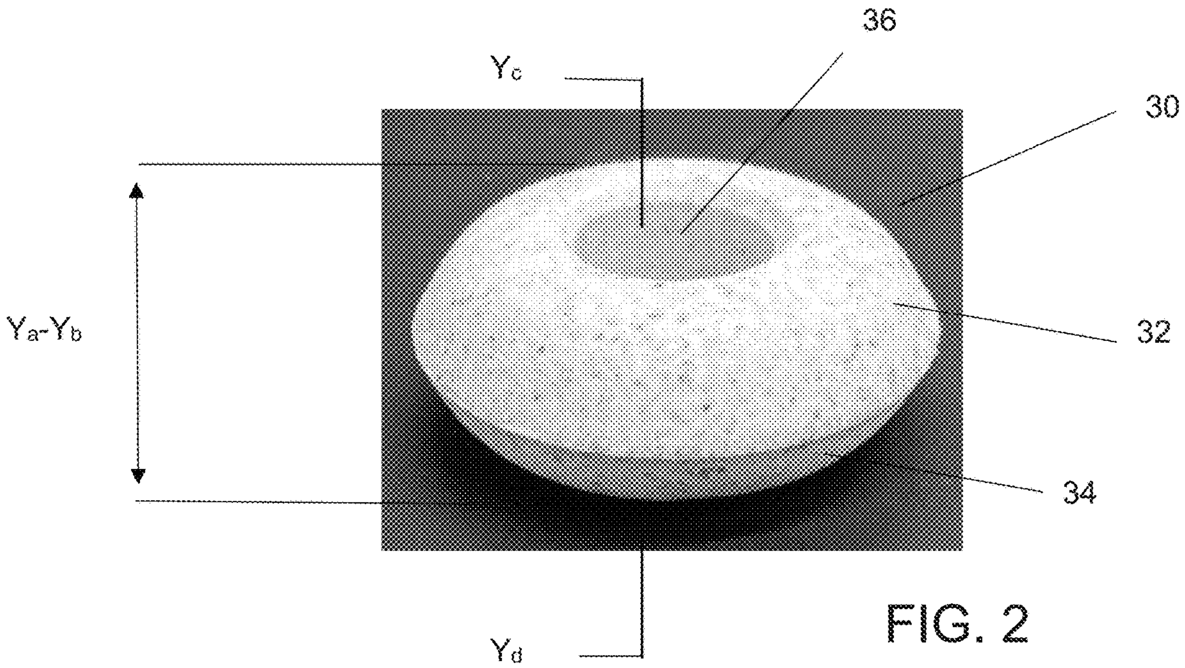
FIG. 2 is a perspective view of the unit dose of FIG. 1.

An exemplary solid unit dose composition of the present invention is shown in FIGS. 1 and 2. The head 30 contains a top surface 32, a bottom surface 34, and a height Ya-Yb extending from the top surface to the bottom surface. An indentation, specifically, a cylindrical socket 36 is contained in the top surface and is adapted to receive and frictionally engage with a wand (not shown). The depth Yc-Yd of the cylindrical socket 36 is the same as height Ya-Yb or may be less than the height Ya-Yb.

The unit dose head 30 contains a cleaning composition comprised of powders and pellets that have been compressed into a tablet.

Cleaning head 30 is shown as substantially cylindrical and having a diameter but it may take other shapes.

The solid head 30 may be in various forms including, for example, pellets, blocks, and tablets, but not powders.

In certain embodiments, the solid unit dose cleaning head 30 weighs about 1 to about 70 grams, more preferably about 10 to about 50 grams or about 25 to about 45 grams, most preferably about 20 to about 40 grams.

In certain embodiments, the solid unit dose cleaning head has height of about 0.5 cm to about 10 cm, more preferably about 0.8 cm to about 1 cm. In other embodiments, the tablet has a height of about 5 to about 10 cm. In yet other embodiments, the tablet has a height of about 0.45 to about 0.8 inches, preferably 0.5 to 0.7 inches, more preferably 0.55 to 0.65 inches.

Typically, the solid unit dose cleaning head will have a diameter of about 1.5 to about 3 inches, preferably 1.75 to 2.5 inches, more preferably 2 to 2.375 inches.

In certain embodiments, the solid unit dose cleaning head has a height to diameter ratio of greater than 2:1.

In some embodiments, the solid unit dose cleaning head is a tablet having a hardness of at least 15 N, more preferably at least 20 N, most preferably at least 30 N. In preferred embodiments, the tablet has a hardness greater than 50 N.

The solid cleaning composition contains one or more chemical constituents e.g., cleaning agents, disinfecting agents, and optionally, coloring agents, and fragrance in the form of a head. The cleaning activity is formed by water contacting the head of the device coming into contact with the one or more chemical constituents.

In preferred embodiments, the cleaning composition provides cleaning efficacy, a foaming visual cue, fragrance sensorial experience and slowly dissolves so one does not have to re-store or throw away the cleaning head portion of the product. The toilet cleaning head is advantageously dissolvable, which negates the need for the consumer to store an unpleasant, bacteria filled cleaning tool.

Cleaning Composition

The cleaning composition will contain a variety of ingredients selected from surfactants, virgin soap pellets, fillers, such as clays, water-soluble inert salts, sugars, and cellulose(s), organic acid, organic acid buffering agents, and may also contain fragrance, dye, flow aid, colorant, binder, lubricant, glidant, and boron compounds. In some embodiments, the composition consists essentially of or consists of anionic surfactant, water-soluble salt, clay or microcrystalline cellulose, organic acid, organic acid buffering agent, virgin soap pellets, binder, and lubricant/glidant. In some of those embodiments, the composition consists essentially of or consists of anionic surfactant, sodium chloride, bentonite clay, citric acid, sodium bicarbonate, virgin soap pellets, binder, and lubricant/glidant. In other embodiments, the composition consists essentially of or consists of anionic surfactant, water-soluble salt, organic acid, organic acid buffering agent, virgin soap pellets, binder, fragrance, and dye. In some of those embodiments, the composition consists essentially of or consists of anionic surfactant, sodium chloride, citric acid, sodium bicarbonate, virgin soap pellets, corn starch, fragrance, and dye. In yet other embodiments, the composition consists of anionic surfactant, water-soluble salt, organic acid, organic acid buffering agent, virgin soap pellets, borax, binder, fragrance, and dye. In some embodiments, the composition consists essentially of or consists of anionic surfactant, sodium chloride, citric acid, sodium bicarbonate, virgin soap pellets, borax, corn starch, fragrance, and dye. Water range of ingredients typically ranges from 0.04 to about 0.68. The ideal water activity of ingredients falls between 0.14 to 0.25. Specific ingredients and amounts are further discussed herein.

Surfactant

The toilet cleaning composition comprises one or more surfactants, of which one or more is anionic, and any additional surfactants may be cationic and/or non-ionic and/or semi-polar and/or zwitterionic, or a mixture thereof. The anionic surfactant is present in an amount of about 5% to about 50% by weight of the composition, preferably about 10 to about 30% by weight of the composition most preferably about 12% to about 25% by weight of the composition. The surfactant(s) is chosen based on the desired cleaning application, and may include any conventional surfactant(s) known in the art.

Anionic surfactants are useful in the context of this invention to both improve the cleaning properties of the compositions. The anionic surfactants used in this invention can be any anionic surfactant that is substantially water soluble. “Water soluble” surfactants are, unless otherwise noted, here defined to include surfactants which are soluble or dispersible to at least the extent of 0.01% by weight in distilled water at 25° C. “Anionic surfactants” are defined herein as amphiphilic molecules with an average molecular weight of less than about 10,000, comprising one or more functional groups that exhibit a net anionic charge when in aqueous solution at pH of between 6 and 11.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid, and combinations thereof.

The anionic surfactant may be, for example, Sodium Xylene Sulphonate, Sodium Dodecylbenzenesulfonate, Sodium C14-C16 Alpha Olefin Sulfonate, Sodium Cocosulfate, Sodium Lauryl Sulfate, Sodium Cocoyl Isethionate, or Sodium Olefin Sulphonate.

In certain preferred embodiments, the anionic surfactant is selected from Sodium Dodecylbenzenesulfonate, Sodium Cocoyl Isethionate, Sodium Olefin Sulphonate, and combinations thereof. In some of those embodiments, the anionic surfactant consists essentially of or consists of an alpha olefin sulfonate, such as Sodium Olefin Sulphonate.

Non-ionic surfactants may also be useful in the context of this invention to both improve the cleaning properties of the compositions and to contribute to product stability. A wide range of non-ionic surfactants can be used herein.

For example, the non-ionic surfactants include, but are not limited to alkoxylated alcohols, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, or a combination thereof. Preferably, the nonionic surfactant is a glucamide in aqueous-alcoholic solution, such as Capryloyl/Caproyl Methyl Glucamide.

If included in the cleaning compositions, the amount of non-ionic surfactant is typically about 1 weight percent to about 20 weight percent, preferably about 1.5 to about 15 weight percent based on total weight of the cleaning composition.

The cleaning composition may contain from about 0% to about 40% by weight of a semipolar surfactant. Non-limiting examples of semipolar surfactants include amine oxides (AO) such as alkyldimethylamineoxide, N-(coco alkyl)-N,N-dimethylamine oxide and N-(tallow-alkyl)-N,N-bis(2-hydroxyethyl) amine oxide, and combinations thereof.

The cleaning composition may contain from about 0% to about 40% by weight of a zwitterionic surfactant. Non-limiting examples of zwitterionic surfactants include betaines such as alkyldimethylbetaines, sulfobetaines, and combinations thereof.

In preferred compositions, the surfactant in the composition consists essentially of anionic surfactant or consists of an anionic surfactant ingredient.

Virgin Soap Pellets

Inclusion of virgin soap pellets, such as those used to make soap bars, can improve the cleaning performance of the compositions herein. The cleaning compositions will typically include about 5% to about 50% by weight, more preferably about 8% to about 30%, most preferably about 12% to about 20% by weight of the composition of virgin soap pellets.

In a typical soap making operation, after the soap is dried it is usually pelletized and then subject to amalgamation in a piece of equipment called an amalgamator where a non-aqueous slurry of colorant, perfume and optional additives that are desired in the final product (such as antibacterial agents, polymers, silicones, encapsulated materials) are added. As used herein, "virgin soap pellets" refers to the soap pellets produced prior to the addition of colorant, perfume and optional additives.

That is, the virgin soap pellets contemplated herein comprise one or more "soaps," which, for purposes of describing this component of the compositions of the present invention, have the meaning as normally understood in the art: monovalent salts of monocarboxylic fatty acids.

The counterions of the salts generally include sodium, potassium, ammonium and alkanol ammonium ions, but may include other suitable ions known in the art.

Typically, the soap components comprise salts of long chain fatty acids having chain links of the alkyl group of the fatty acids from about 8 carbon atoms, to about 18 carbon atoms in length. The particular length of the alkyl chain of the soaps is selected for various reasons including cleansing capability, lather capability, cost, and the like. Preferred soaps are those having a carbon chain length of from 12 to 24, preferably from 14 to 18 carbon atoms. These monovalent salts would normally be sodium salts, although some cations, such as K (potassium), Mg (magnesium), or alkanolammonium ions could be used. The preferred insoluble fatty acid soap is at least 90% by weight, more preferably at least 95% by weight selected from the group consisting of sodium tallowate, sodium palm kernelate, sodium myristate, sodium palmitate, sodium stearate and mixtures of any two or more thereof. Other insoluble soaps, particularly higher fatty acid insoluble soaps, can also be used. An 85/15 ratio of tallow to palm kernel fatty acids is particularly preferred as the pure soap component of virgin soap pellets.

The virgin soap pellets will typically include greater than 50% by weight of a soap mixture. Preferably, the soap pellet base will include about 55% to about 90% by weight of one or more soaps. In a preferred embodiment of the invention, the soap mixture comprises about 70% to about 75% by weight of the soap pellet base composition.

Among the additives employed in the soap pellet base are free fatty acids (FFA) which serve to enhance the lathering or foaming ability of the bars. Such fatty acids also have an effect on the mildness of the soap.

Exemplary useful fatty acids include, but are not limited to: Arachidic Acid, Arachidonic Acid, Beeswax Acid, Behenic Acid, Capric Acid, Caproic Acid, Caprylic Acid, C10-40 Hydroxyalkyl Acid, C10-40 Isoalkyl Acid, C32-36 Isoalkyl Acid, Coconut Acid, Corn Acid, Cottonseed Acid, Erucic Acid, Hydrogenated Coconut Acid, Hydrogenated Menhaden Acid, Hydrogenated Palm Acid, Hydrogenated Tallow Acid, Hydroxystearic Acid, Isomerized Linoleic Acid, Isomerized Safflower Acid, Isostearic Acid, Lauric Acid, Linoleic Acid, Linolenic Acid, Linseed Acid, Myristic Acid, Oleic Acid, Olive Acid, Palmitic Acid, Palm Kernel Acid, Peanut Acid, Pelargonic Acid, Rapeseed Acid, Rice Bran Acid, Ricinoleic Acid, Safflower Acid, Soy Acid, Stearic Acid, Sunflower Seed Acid, Tall Oil Acid, Tallow Acid, Undecanoic Acid, Undecylenic Acid, Wheat Germ Acid.

In certain embodiments, the virgin soap pellet base comprises about 0.5% to 5% free fatty acids.

The soap pellets used in the present invention may comprise one or a combination of water-soluble polyhydric organic solvents including Preferred water soluble organic polyols having two hydroxyl groups (2-OH) include those selected from the group consisting of: propylene glycol; dipropylene glycol; butylene glycol; ethylene glycol; 1,7-heptanediol, monoethylene glycols, polyethylene glycols, polypropylene glycols of up to 8,000 molecular weight; mono-$C_{1-4}$ alkyl ethers of any of the foregoing; and mixtures thereof. Preferred water-soluble polyhydric solvents that have at least three hydroxyl groups ($3^{+}$-OH) include glycerine, and any sugar alcohol, such as sorbitol.

Examples of suitable sugar alcohols include: Tetritols: Erythritol threitol, D-threitol, L-threitol, and D,L-threitol; Pentitols: Ribitol, arabinitol, D-arabinitol, L-arabinitol, D,L-arabinitol and xylitol; Hexitols: Allitol, dulcitol (galacitol), glucitol, sorbitol, (D-glucitol), L-glucitol, D,L-glucitol, D-mannitol, L-mannitol, D,L-mannitol, altritol, D-altritol, L-altritol, D,L-altritol, iditol, D-iditol, and L-iditol; Disaccharide alcohols: Maltitol, lactitol and isomalt.

Preferably, the soap pellet base composition comprises glycerin, sorbitol, or a mixture of glycerin and sorbitol. In one exemplary embodiment, the soap pellet base comprises about 5% to about 10% by weight glycerin.

Preferably, the soap base composition also comprises water. In one exemplary embodiment of the present invention, the soap pellet base composition comprises about 10 to about 20% by weight water. In a preferred embodiment of the present invention, the soap pellet base composition comprises about 12 to about 16% by weight water.

The soap pellets may further comprise one or more chelating agents, organic and inorganic salts, and/or stabilizers.

A soap mixture may be manufactured by saponifying suitable raw oils, such as, for example, tallow, palm oil, stearin oil and palm kernel oil, with a caustic solution, such as sodium hydroxide, to form a "neat soap." The pH of the neat soap may be alkaline when produced and can be suitably adjusted by the addition of an organic acid, such as citric acid. Free fatty acid may also be added to the neat soap to neutralize any undesirable excess caustic solution and to enhance the lather characteristics of the resulting soap. Optionally, at this stage of the process, preservative agents, chelating agents, and inorganic and/or organic salts may also be added to form the soap pellet base composition. The neat soap may then be spray dried to reduce the moisture content of the soap, yielding soap pellets. In one embodiment of the invention, the moisture content is reduced to about 10% by weight of the soap pellets, with about 5% available water.

In certain embodiments, the virgin soap pellets have water activity of about 0.68. As mentioned, water range of ingredients typically ranges from 0.04 to about 0.68 but the ideal water activity of ingredients falls between 0.14 to 0.25. The soap pellets can optionally be dried to lower the water activity to as low as 0.04 if needed and will help reduce the available moisture in the formula. Both undried and dried pellets yield useful solid toilet cleaning products, but dried pellets may be preferred in some instances due to less moisture in a final compressed product.

Based on literature and Karl Fisher analysis virgin soap pellets utilized by the inventors have about 10% total moisture content with about ~5% available water. For formulas having an 18% by weight inclusion of virgin soap pellets at 5% active water levels, this results in a total water content of ~1% in a 45 g puck. Both undried (i.e. untreated) soap pellets and dried soap pellets have yielded useful products, but dried soap products may be preferable due to less moisture in the total product.

Preferably, the ratio of virgin soap pellets to surfactant is from 0.5:1 to 2:1. In especially preferred embodiments, the ratio of virgin soap pellets to surfactant is from about 1:1 to 1.5:1, more preferably about 1.2:1 to 1.3:1. Such ratios will improve the physical characteristics of the formula (e.g., strength, stability, longevity) while providing a sufficient level of dissolution.

Although described in terms of pellets, the soap pellet base composition may be prepared in other forms for addition into the inventive cleaning compositions. The term "virgin soap pellets" is meant to encompass pellets as well as other forms (e.g., granules, ribbons, slugs) of the virgin soap base composition described herein.

Filler

The cleaning composition can include about 0% by about 80% fillers, more preferably about 2% to about 55%, most preferably about 4% to about 50% by weight.

In certain embodiments, the filler comprises a water-soluble salt, a clay, a sugar, and/or a cellulose. In some of those embodiments, the filler consists of water-soluble salt and clay. In other embodiments, the filler consists of water-soluble salt and a cellulose, such as microcrystalline cellulose. In yet other embodiments, the filler consists of water-soluble salt.

The water-soluble salt can be, for example, a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, or any combination thereof. Examples include various alkali metal and/or alkaline earth metal sulfates, chlorides, borates and citrates.

Specific inert salts which may be selected include sodium chloride, potassium chloride, calcium chloride, magnesium chloride, sodium sulfate, potassium sulfate, magnesium sulfate, sodium carbonate, potassium carbonate, sodium hydrogen carbonate, potassium hydrogen carbonate, sodium acetate, potassium acetate, sodium citrate, potassium citrate, sodium tartrate, potassium tartrate, potassium sodium tartrate, calcium lactate.

Cellulose fillers include microcrystalline cellulose ("MCC") and powdered cellulose, which are commercially available as inactive fillers in processed foods and pharmaceuticals. Instead of or in addition to powdered cellulose, cellulose derivatives such as ethyl cellulose, hydroxypropyl cellulose, carboxymethylcellulose, hydroxypropyl methyl cellulose, hydroxyethylmethyl cellulose, hydroxyethyl cellulose can be use. Preferably, the cellulose filler is microcrystalline cellulose.

A sugar filler may also be used. In the present context, sugar fillers refer to saccharide containing components commonly known in the art, such as sucrose, dextrose, maltose, saccharose, lactose, sorbose, dextrin, trehalose, D-tagatose, dried invert sugar, fructose, levulose, galactose, corn syrup solids, and the like, alone or in combination.

The filler can be, for example, dextrose, fructose, galactose, isoglucose, glucose, sucrose, raffinose, isomalt, xylitol, or any combination thereof.

In some embodiments, the filler may include a clay. In one embodiment, the clay is a smectite clay, e.g., a Bentonite clay, Beidellite clay, a Hectorite clay, a Laponite clay, a Montmorillonite clay, a Nontronite clay, a Saponite clay, a Sauconite, clay, or any combination thereof.

In one embodiment, the clay is a Bentonite clay.

The filler may comprise abrasive particles. By including abrasive particles, the cleaning composition provides for both scouring and cleaning of a surface.

In certain embodiments a boron compound, such as borax, may be used in the compositions.

The other components of the cleaning composition can act as a binder and carrier to secure the abrasive particles until they are exposed to a solvent. For instance, the water-soluble binder may be a surfactant. Additionally, the water-soluble binder may include a combination of various water-soluble binders, one of which may be a surfactant. Also, the water-soluble binder may include a combination of various surfactants. A surfactant is preferable because it provides additional cleaning capabilities to the cleaning composition.

The abrasive particles include the abrasive materials as well as combinations and agglomerates of such materials. In applications where aggressive scouring or other end uses are not contemplated or desired, softer abrasive particles (e.g., those having a Mohs' hardness in the range between 1 and 7) can be used to provide the head 30 with a mildly abrasive surface. Harder abrasive materials (e.g., having a Mohs' hardness greater than about 8) can also be included within the abrasive cleaning article of the invention to provide a finished article having a more aggressive abrasive surface. The brasive particles begin to be released from the cleaning composition when it is submerged in water as the binder dissolves in the water.

Organic Acid

Examples of acids suitable for use the cleaning compositions include, but are not limited to, tartaric acid, citric acid, fumaric acid, adipic acid, malic acid, oxalic acid, lactic acid, or sulfamic acid, either alone or in combination, preferably citric, glycolic, malic and lactic acid. Typically, the compositions are prepared from citric acid or a combination of citric acid and glycolic acid.

The amount of acid included in the compositions is an amount, when used in conjunction with an organic acid buffer, that is sufficient to maintain pH of greater than 4.6 when the composition is dissolved in water.

The acid typically comprises about 1% to about 30% by weight of the composition.

Buffering Agent

Examples of buffering agents include carbonate or bicarbonate salts which include, but are not limited to, the alkali metal salts. Sodium carbonate, calcium carbonate, magnesium carbonate, ammonium carbonate, potassium carbonate, sodium bicarbonate, and calcium bicarbonate may all be employed.

The carbonate or bicarbonate salt may in conjunction with a selected filler provide the cleaning composition with the aforementioned abrasive particles.

As mentioned, the amount of organic acid buffer is that which is sufficient to maintain pH of greater than 4.6 when the composition is dissolved in water.

Carbonate or bicarbonate salts will typically be present in an amount of about 10% to about 40% by weight of the composition.

The acid and carbonate or bicarbonate salt may result in the composition being effervescent. In certain embodiments, the presence of bubbles results from the formation of carbon dioxide. For instance, when added to a liquid, such as water, a mixture of at least one acid and at least one carbonate or bicarbonate salt results in a chemical reaction that liberates carbon dioxide. In one aspect, both the acid and the salt may be in anhydrous form.

The term "effervescent," as defined herein, means any product capable of forming bubbles in liquid environments and may also be considered any product capable of liberating carbon dioxide in or out of liquid environments. Likewise, "effervescence" means forming bubbles in liquid environments or liberating carbon dioxide in or out of liquid environments.

Buffering agents also include or consist of conjugate base salts, such as alkali metal salts of the organic acid. For instance, where the organic acid is citric acid buffering agents comprise monosodium citrate (monobasic), disodium citrate (dibasic), trisodium citrate (tribasic), and combinations thereof, which may be included in in an amount of about 0% to about 20% by weight of the composition, more preferably about 0% to about 10% by weight of the composition, most preferably about 0% to about 4% by weight of the composition.

Color

The cleaning composition may further include a colorant. The colorant may be oil- or water-soluble, and typically is an anhydrous powder dye. The amount of colorant to be used may depend on the color intensity desired and the cost of the dye, and may be added at levels up to about 2.5% by weight of the cleaning composition.

The choice of the colorant will depend largely on the color desired for the water into which the cleaning compositions is to be dispensed. Examples of suitable water-soluble colorants include, but are not limited to, acid blue #9, Basacid Blue NB 755®, FD&C yellow #5, FD&C Red #33, and D&C Green #8. Oil-soluble colorants include, but are not limited to, Nitro Fast Red A 4B®, solvent yellow 72, Sandoplast Green G® and Unicert Blue.

Fragrance

In certain embodiments, the cleaning compositions include fragrance and/or perfume. In some of these embodiments, the fragrance may be released into the atmosphere through the formation of carbon dioxide. The fragrance is typically present in an amount of up to about 6% by weight of the cleaning composition.

The fragrance may be an oil fragrance, an essential oil, botanical extracts, synthetic fragrance materials, or other compounds that provide a desirable odor.

In some embodiments, a fragrance oil can be, for example, essential oils such as angelica root oil, anise oil, arnica blossom oil, basil oil, bay oil, champaca blossom oil, citrus oil, silver fir oil, silver fir cone oil, elemi oil, eucalyptus oil, fennel oil, pine needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, canaga oil, cardamom oil, cassia oil, pine needle oil, copaiba balsam oil, coriander oil, spearmint oil, caraway oil, cumin oil, labdanum oil, lavender oil, lemongrass oil, lime blossom oil, lime oil, mandarin oil, balm oil, mint oil, musk seed oil, muscatel oil, myrrh oil, clove oil, neroli oil, niaouli oil, olibanum oil, orange blossom oil, orange oil, origanum oil, palmarosa oil, patchouli oil, peru balsam oil, petitgrain oil, pepper oil, peppermint oil, pimento oil, pine oil, rose oil, rosemary oil, sage oil, sandalwood oil, celery oil, spike oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil and ambrettolide, ambroxan, alpha-amylcinnamaldehyde, anethol, anisaldehyde, anise alcohol, anisol, anthranilic acid methyl ester, acetophenone, benzyl acetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptine carboxylic acid methyl ester, heptaldehyde, hydroquinone dimethyl ether, hydroxycinnamaldehyde, hydroxycinnamyl alcohol, indol, irone, isoeugenol, isoeugenol methyl ether, isosafrole, jasmone, camphor, carvacrol, carvone, p-cresol methyl ether, cumarin, p-methoxyacetophenone, methyl n-amyl ketone, methyl anthranilic acid methyl ester, p-methyl acetophenone, methyl chavicol, p-methyl quinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenyl ethyl alcohol, phenyl acetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undelactone, vanillin, veratrum aldehyde, cinnmaldehyde, cinnamyl alcohol, cinnamic acid, cinnamic acid ethyl ester, cinnamic acid benzyl ester, diphenyl oxide, limonene, linalool, linalyl acetate and propionate, melusat, menthol, menthone, methyl n-heptenone pinene, phenyl acetaldehyde, terpinyl acetate, citral, citronellal, and mixtures thereof.

In some embodiments, the fragrance can be an ester, an ether, an aldehyde, a ketone, an alcohol, a hydrocarbon, an essential oil, and a combination thereof.

In some embodiments, the fragrance can be, for example, adoxal (2,6,10-trimethyl-9-undecenal), anisaldehyde (4-methoxybenzaldehyde), cymal (3-(4-isopropyl-phenyl)-2-methylpropanal), ethylvanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), 2,4-dimethyl-3-cyclohexene-1-carboxaldehyde (triplel), 4-methoxybenzaldehyde, benzaldehyde, 3-(4-tert-butylphenyl)propanal, 2-methyl-3-(paramethoxyphenyl) propanel, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]decylidene-8)butanal, octahydro-4,7-methano-Hindenecarboxaldehyde, 3-ethoxy-4-hydroxybenzaldehyde, para-ethyl-alpha,alphadimethylhydrocinnamaldehyde, alpha-methyl-3,4-(methylenedioxy)hydrocinnamaldehyde, 3,4-ethylenedioxybenzaldehyde, alphan-hexylcinnamaldehyde, m-cymene-7-carboxaldehyde, alpha-methyl phenylacetaldehyde, 7-hydroxy-3,7-dimethyloctanal, undecanal, 2,4,6-trimethyl-3-cyclohexene-1-carboxaldehyde, 4-(3)(4-methyl-3-pentenyl)-3-cyclohexenecarboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tertbutyl) propanel, dihydrocinnamaldehyde, 1-methyl-4-(4-methyl-3-pentenyl)-3-cyclohexene-1-carboxaldehyde, 5- or 6-methoxyhexahydro-4,7-methanoindane-1- or -2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyloctanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindane-1-carboxaldehyde, 2-methyloctanal, alpha-methyl-4-(1-methylethyl)benzene acetaldehyde, 6,6-dimethyl-2-norpinene-2-propionaldehyde, paramethylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methyl nonyl acetaldehyde, hexanel and trans-2-hexenal.

In some embodiments, the fragrance can be, for example, methyl betanaphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alphadamascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gammamethyl ionone, fleuramone (2-heptylcyclopentanone), dihydrojasmone, cisjasmone, Iso E Super (1-(1,2,3,4,5,6J,8-octahydro-2,3,8,8-tetramethyl-2-naphthalenyl)ethan-1-one (and isomers)), methyl cedrenyl ketone, acetophenone, methyl acetophenone, para-methoxyacetophenone, methyl beta-naphtyl ketone, benzyl acetone, benzophenone, para-hydroxyphenylbutanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)indanone, 4-damascol, dulcinyl(4-(1,3-benzodioxol-5-yl)butan-2-one), Hexalon (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentyl cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

In some embodiments, the fragrance can be, for example, 10-undecen-1-ol, 2,6-dimethylheptan-2-ol, 2-methylbutanol, 2-methylpentanol, 2-henoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, ß-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylat, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

In some embodiments, the fragrance can be, for example, for example, benzyl acetate, phenoxyethyl isobutyrate, p-tert-butylcyclohexyl acetate, linalyl acetate, dimethyl benzyl carbinyl acetate (DMBCA), phenyl ethyl acetate, benzyl acetate, ethylmethylphenyl glycinate, allyl cyclohexyl propionate, styralyl propionate, benzyl salicylate, cyclohexyl salicylate, floramat, melusat and jasmacyclat.

In one embodiment, the fragrance can be, for example, for example, benzyl ethyl ether and ambroxan. The hydrocarbons include mainly terpenes, such as limonene and pinene.

In some embodiments, the fragrance is, for example, a musky scent, a pungent scent, a camphoraceous scent, an ethereal scent, a floral scent, a fruity scent, a peppermint scent, an aromatic scent, a gourmand scent, or any combination thereof.

In some embodiments, the fragrance can be mixtures of various fragrances, which can be referred to as a perfume or perfume oil. Perfume oils of this kind may also contain natural fragrance mixtures, as are obtainable from plant sources.

In some embodiments, the fragrance can be a fragrance precursor. "Fragrance precursor" refers to compounds which only release the actual fragrance following chemical conversion/separation, for example, when exposed to light or other environmental conditions, such as pH, temperature, etc. Treatment agents of this kind are often referred to as pro-fragrances.

Other fragrances known in the art, or any fragrance commercially available from a fragrance supplier (e.g. Firmenich, Givaudan, IFF, Symrise, Agilex, The Good Scents Company, Atlanta, Ga.)

Other fragrances and/or perfumes useful in the practice of the invention include the fragrances commonly used in the household and industrial cleaning and sanitizing industry.

As those of skill will appreciate, fragrances typically comprise highly concentrated solid ingredients. The presence of a non-hygroscopic solvent may be necessary to dissolve, disperse or mix these solid ingredients to make the fragrance homogenous throughout the solid cleaning head. Since fragrance manufacturers often incorporate solvents directly into their fragrances, coordinating solvent selection with the fragrance manufacturer may be necessary.

In some embodiments, the fragrance is, for example, present in the cleaning composition in an amount of about 0.5 wt. %, about 1.0 wt. %, about 1.5 wt. %, about 2.0 wt. %, about 3.0 wt. %, about 4.0 wt. %, or about 5.0 wt. %. In some embodiments, the fragrance is, for example, present in an amount from about 0.1 wt. % to about 5 wt. %, from about 0.5 wt. % to about 4.5 wt. %, about 0.5 wt. % to about 4 wt. %, from about 1.0 wt. % to about 4 wt. %, or from about 1.5 wt. % to about 4 wt. %.

Other Components:

The solid cleaning composition can comprise other customary additives such as binders to hold the different components in the system together, disintegrants to hold the composition together when dry and break the tablet quickly once being exposed to water, and flow and tableting aids to ease the compression process and so on.

Binder

The cleaning compositions preferably include water-soluble binder. Those having a having a weight average molecular weight less than 200,000 will typically be more readily soluble in water. Many water-soluble binders are known. The water-soluble binder may be oligomeric or polymeric, and may include copolymers and blends thereof. Nonlimiting examples of polymers and copolymers suitable for use as water-soluble binders include polyethylene glycol, polyvinylpyrrolidones, polyvinylpyrrolidone/vinyl acetate copolymers, polyvinyl alcohols, carboxymethyl celluloses, hydroxypropyl cellulose starches, polyethylene oxides, polyacrylamides, polyacrylic acids, cellulose ether polymers, polyethyl oxazolines, esters of polyethylene oxide, esters of polyethylene oxide and polypropylene oxide copolymers, urethanes of polyethylene oxide, and urethanes of polyethylene oxide and polypropylene oxide copolymers.

In one embodiment, a preferred binder is hydroxypropylmethylcellulose. In other embodiments, the preferred binder is corn starch.

The binder may be present from 0% to 15% by weight of the composition, preferably from about 0.5% to about 10%, most preferably from 1% to about 7% by weight of the cleaning composition.

To help control moisture, corn starch was added as a binder & desiccant at 4% for various prototypes. This helped stabilize the formula to pre-mature wetting (due to moisture migration from the fragrance or soap to other materials).

In certain embodiments, a target ratio of binder to water-soluble salt is about 1 to 1. In certain of those embodiments, the binder is starch and the filler comprises or consists of salt.

Lubricant

A lubricant may be used in the cleaning formulations. The lubricant should combine hydrophobic and hydrophilic properties in order to achieve both good lubrication and a short disintegration time. Surfactants such as sodium lauryl sulfate, fumaric acid, magnesium stearate and magnesium lauryl sulfate can be used. The lubricant may also be selected from wheat germ oil, canola oil, safflower oil, sunflower seed oil, sesame oil, cotton seed oil, corn oil, palm oil, coconut oil, flax seed oil, olive oil, mineral oil, PEG 200, PEG 300, PEG 400, and combinations thereof.

A lubricant can also be added when compressing the composition. For example, optionally prior to introduction of a preform into a die, one or more of the interior surfaces of the mold may be sprayed with a mold release material or other lubricant such as mineral oil or a paraffin oil.

The lubricant may be included up to 5% by weight of the composition, preferably less than about 1% by weight, more preferably about 0.5% by weight or less of the composition.

Glidant

A glidant may be included in the composition to promote the flow properties of tablet granules or powder materials.

Examples of glidants that may be used include colloidal silicon dioxide, talc, tribasic calcium phosphate, hydrophobic colloidal silica, hydrophobic fumed silica, cellulose, magnesium oxide, sodium stearate, magnesium silicate, and magnesium trisilicate.

The inclusion of silicate has been observed to improve powder flow and humidity control of tablets made in accordance with the formulations disclosed herein.

When included, the glidant is typically present at less than 5% by weight of the composition, more preferably about 2% by weight or less, most preferably less than 1% by weight.

Methods of Use

To use the cleaning compositions to clean a surface, the composition is compressed e.g., into a tablet and the compressed unit is exposed to a solvent, typically water, which is capable of dissolving the water-soluble filler/soaps and surfactant. The cleaning composition may be submerged in water from a toilet, sink, or bathtub depending on the surface being cleaned.

Upon contact with the solvent, the water-soluble filler begins to dissolve. The soap particles and surfactant provide detergent effects for cleaning the surface. Any abrasive particles are also released onto the surface to be cleaned and provide the abrasive material for scouring the surface. The surfactant will foam when exposed to the solvent. The foam helps to suspend the released abrasive particles for prolonged use in scouring the surface.

The release of the abrasive particles assists in scouring the surface. However, because the abrasive particles are not rigidly adhered to any component, the abrasive particles are allowed to roll during cleaning, which prevents excessive scratching and damage to the surface.

Upon continual exposure to the solvent, a majority of any water-soluble filler and soap is dissolved, and therefore a majority of abrasive particles are exposed to the surface.

Therefore, upon completion of the cleaning, the user may flush the composition down the toilet.

Method of Preparation

The solid compositions described herein can be manufactured in by various methods including direct compression, wet granulation, or dry granulation followed by compression. Alternatively, solids can be formed by an extrusion process.

In one embodiment, the method of manufacture may comprise grinding all powder materials to a fine particle size using a mortar and pestle or by passing through a sieve; melting ingredients, such as nonionic surfactant, to around 80° C. and combining all the materials until uniform. The resulting mixture is them pressed into tablets.

In another embodiment, powder ingredients can be combined in a v-blender or with a mixer and directly compressed into a tablet.

In yet another embodiment, an acid premix and a basic premix may be prepared and sieved or ground to a fine particle size. The two mixtures can each be wet granulated and dried in an oven. The dried granules are blended together with any extragranular glidant and/or lubricant. The final mixture is compressed into tablets.

In a further embodiment, the method of manufacture may comprise extruding the treatment composition and cutting into pucks. The extrusion process may be a co-extrusion process and the head has at least two distinct portions having different compositions. The method may include a step of wrapping the head in a water soluble film.

Typically, the unit dose is manufactured by compression on conventional tablet press using round or oval convex or flat face tooling. In preferred embodiments, the tooling is designed such that the compressed solid contains an indentation in at least one of its surfaces that can be adapted to receive a wand. The depth of the indentation Yc-Yd can be less than the height Ya-Yb or can be the same as height Ya-Yb. In one embodiment, the compressed solid can comprise an annular shape with a cylindrical socket 36 in its center that extends either partially or entirely through the height of the compressed solid, whereby the compressed solid can be mounted on a pin extending from a wand.

The depth of the indentation may be anywhere from 25% to 100% of the height of the compressed solid.

Weights of tablets: the tablets will typically weigh about 1 to about 70 grams, more preferably about 10 to about 50 grams, most preferably 20 to about 35 grams. In certain embodiments, a tablet weighs about 2 to 3 grams, more preferably 2.25 to 2.5 g. In other embodiments, the tablet weighs about 40 to 50 grams, or about 45 grams.

Hardness: A tablet strength above 15 N is acceptable, more preferably the tablet hardness is over 20 N, most preferably over 50 N.

EXAMPLES

Example 1: Virgin Soap Pellets

Virgin soap pellets in the examples refers to commercially sourced glycerin-based tallow soaps, which are known in the art. For example, in MSDS of one type of DIAL Bar Soap, it discloses the following composition/information on ingredients in Table 1.

TABLE 1

| CAS No. | Ingredient | Wt % |
|---|---|---|
| 67701-11-5 & 67701-10-4 | Sodium Soap | 60-100 |
| 56-81-5 | Glycerin | 1-5 |

Additionally, various virgin soap pellets or the like have been disclosed in U.S. Pat. Nos. 5,296,159, 5,534,265, 5,585,104, 5,703,026, 5,720,961, 5,952,289, 5,965,508, 6,054,425, and 6,172,026, the disclosures of which are incorporated into this application in their entireties. It is contemplated that such products are interchangeable with the virgin soap pellets used herein.

Example 2: Virgin Soap in Toilet Cleaning Tablet Compositions

Toilet cleaning tablet compositions shown in Table 2B were prepared using the virgin soap pellets of Example 1. The experiment varied the amount of bentonite clay, sodium chloride and virgin soap pellets while maintaining the same 43.12% level of the other ingredients (acid, bicarbonate, anionic surfactant, fumed silica, magnesium stearate and Hypromellose). The formulas included 14% by weight of anionic surfactant, which was a 90% active mixture of $C_{14/16}$ alpha olefin sulphonate, sodium salt.

The tested ratios of the sodium chloride, clay and virgin soap pellets were as shown in Table 2A and comprised 56.88% of the final formulas (with the other 43.12% coming from the locked ingredients):

TABLE 2A

| | Bentonite | NaCl | Virgin Soap Pellets | Ratio Soap:Surfactant |
|---|---|---|---|---|
| Formula 1 (Comparative) | 5% | 5% | 46.88% | 3.7:1 |
| Formula 2 (Comparative) | 10% | 10% | 36.88% | 2.9:1 |
| Formula 3 | 15% | 15% | 26.88% | 2.1:1 |
| Formula 4 | 20% | 20% | 16.88% | 1.3:1 |
| Formula 5 | 25% | 25% | 6.88% | 0.5:1 |

TABLE 2B

| Ingredient/Comp. | 2-1 | 2-2 | 2-3 | 2-4 | 2-5 |
|---|---|---|---|---|---|
| Virgin Soap Pellets | 46.88 | 36.88 | 26.88 | 16.88 | 6.88 |
| Sodium Chloride | 5.00 | 10.00 | 15.00 | 20.00 | 25.00 |
| Bentonite | 5.00 | 10.00 | 15.00 | 20.00 | 25.00 |
| Anionic Surfactant | 14.00 | 14.00 | 14.00 | 14.00 | 14.00 |
| Sodium Bicarbonate | 9.60 | 9.60 | 9.60 | 9.60 | 9.60 |
| Citric Acid | 14.75 | 14.75 | 14.75 | 14.75 | 14.75 |
| Hypromellose 100 cPs | 3.77 | 3.77 | 3.77 | 3.77 | 3.77 |
| Sodium Silicate | 0.50 | 0.50 | 0.50 | 0.50 | 0.50 |
| Magnesium Stearate | 0.50 | 0.50 | 0.50 | 0.50 | 0.50 |

The bentonite, virgin soap pellets, salt, citric acid, sodium bicarbonate, sodium silicate, magnesium stearate, anionic surfactant, and Hypromellose 100 cPs were combined into one mixture and homogenized. Tablets weighing 45 grams were compressed on a Carver press using 0.4 metric tons force.

After formation of tablets, the tablet strength & dissolution rate were measured.

Figure 3:
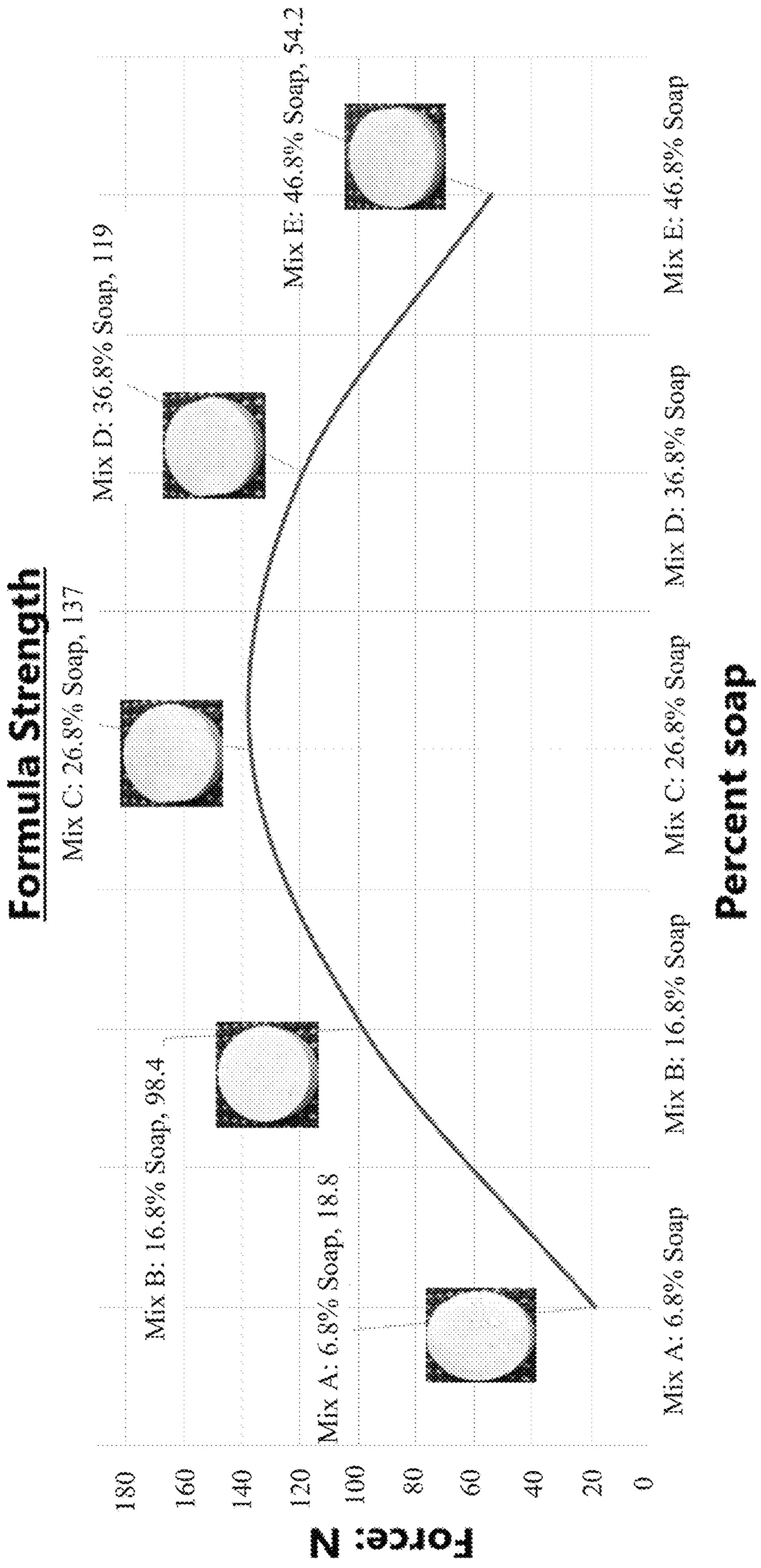
FIG. 3 is a graph plotting strength of a compressed tablet as a function of virgin soap pellet level.

To determine tablet strength (or hardness), the tablet was placed in a Dr. Schleuniger Pharmatron Model 6D Tablet Tester. The machine's default setting then crushes the tablet and gives a Newton force hardness measure. Results as a function of soap/filler levels are shown in FIG. 3.

To determine solubility, the tablet was first weighed (initial weight), then submerged in water for the desired time (3 minutes), then the tablet was removed, dried for 24 hours and then weighed (final weight). The % dissolved is calculated by taking [initial weight minus final weight] divided by initial weight. Results are shown in TABLE 2C. pH of the tablets when dissolved in water was 6.1.

TABLE 2C

| Composition | % Dissolved (3 min) | Strength (N) |
|---|---|---|
| 2-1 | 0.8 | 54.2 |
| 2-2 | 4 | 119 |
| 2-3 | 5.4 | 137 |
| 2-4 | 48.3 | 98.4 |
| 2-5 | 70.6 | 18.8 |

Example 3: Neutral pH Toilet Cleaning Tablet Compositions

Alternative toilet cleaning tablet compositions shown in Table 3 were prepared using the virgin soap pellets of Example 1. The ratio of soap to surfactant was about 1.3:1.

TABLE 3

| Ingredient | 3-1 | 3-2 | 3-3 |
|---|---|---|---|
| Virgin Soap Pellets | 18.00 | 18.00 | 18.00 |
| Sodium Chloride | 4.00 | 4.00 | 4.00 |
| Corn Starch | 4.00 | 4.00 | 4.00 |
| Anionic Surfactant | 14.00 | 14.00 | 14.00 |
| Citric Acid | 20.25 | 20.25 | 20.25 |
| Sodium Bicarbonate | 37.22 | 37.22 | 37.22 |
| Dye | 0.04 | 0.04 | 0.04 |
| Fragrance #1 | 2.50 | 0.00 | 0.00 |
| Fragrance #2 | 0.00 | 2.50 | 0.00 |
| Fragrance #3 | 0.00 | 0.00 | 2.50 |

Ingredients were dry blended in a powder mixer (such as a KITCHENAID mixer) with the fragrance being the last addition. Tablets (6 cm×2 cm) weighing 45 grams were compressed on a Carver press using 0.4 metric tons force.

pH: To measure the pH of the formula 15.85 g (35.22% of 45 g) of each formula was dissolved in 1000 mL of water (scaled down from 96 Fl Oz: 35.22%). After mixing for 2 minutes with a stir bar the formula pH was measured using a pH probe. Each of formulas 6-8 had a pH of 5.85.

Stability: tablets were placed at the following temperatures: 4° C., 25° C., 40° C. and 50° C. After 1 month, the formulas did not suffer from cracking, melting, color changes or fragrance loss under any of the tested temperatures.

Example 3: Dissolvable Toilet Cleaning Tablets

Three toilet cleaning tablet compositions shown in Table 2 were prepared using virgin soap pellets of Table 1 in Example 1. The ratio of soap to surfactant was about 1.3:1.

TABLE 4

| Ingredient | Activity | Comp. 1 | Comp. 2 | Comp. 3 |
|---|---|---|---|---|
| Virgin Soap Pellets | 100 | 18.00 | 18.00 | 18.00 |
| Sodium Chloride | 100 | 4.00 | 2.00 | 0.00 |
| Borax (10 mol) | 100 | 0.00 | 2.00 | 4.00 |
| $C_{14/16}$ alpha olefin sulphonate, sodium salt | 90 | 14.00 | 14.00 | 14.00 |
| Sodium Bicarbonate | 100 | 37.22 | 37.22 | 37.22 |
| Citric Acid | 100 | 20.25 | 20.25 | 20.25 |
| Corn Starch | 100 | 4.00 | 4.00 | 4.00 |
| Acid Blue | 100 | 0.04 | 0.04 | 0.04 |
| Fragrance | | 2.50 | 2.50 | 2.50 |

The Borax (10 mol) listed in Table 2 is commercially available as 20 MULE TEAM BORAX as 99% sodium tetraborate $(Na_2B_4O_7)\cdot 10H_2O$ and 1% water. The virgin soap pellets, salt, citric acid, sodium bicarbonate, corn starch, anionic surfactant, powder dye and borax were combined into one mixture and homogenized. The fragrance oil was added last. Tablets weighing 45 grams were compressed on a Carver press using 7 metric tons force.

The pH after dissolving the tablets was 6 to 6.05. To measure the pH of the formula 15.85 g (35.22% of 45 g) of each formula was dissolved in 1000 mL of water. After mixing for 2 minutes with a stir bar the formula pH was measured using a pH probe.

The tablets were stored at 4° C. and 50° C. The tablets were stable and did not suffer from; cracking, melting, or color changes at both temperatures for over 1 month.

Tablets were tested for cleaning time to breakage by attaching the 45 gram puck to a reusable wand, dipping the puck once into toilet bowl water and then cleaning above the water line in the ceramic bowl for 1 minute and then under the water line (i.e. submerged in water) until breakage of puck from wand. The toilet used was a Standard American model toilet that has approximately 1.28 gallons per flush (Standard American, model 4021N, water level set at 7/16 inches below overflow top). Results are provided in Table 3.

TABLE 5

| Comp. | Total Cleaning Time (seconds) | Submerged Cleaning Time (seconds) |
|---|---|---|
| 1 | 85 | 25 |
| 2 | 120 | 60 |
| 3 | 120 | 60 |

After pucks fell off wand from below water cleaning, all three formulas dissolved without additional agitation within 10 minutes.

It will be appreciated that, within the principles described by this specification, a vast number of variations exist. It should also be appreciated that the embodiments described are only embodiments, and are not intended to limit the scope, applicability, or construction of the claims in any way.

What is claimed is:

1. A compressed toilet brush composition consisting of:
about 10% to about 25% by weight anionic surfactant;
about 10% to about 20% by weight citric acid;
about 10% to about 40% by weight of a citric acid buffering agent;
about 4% to about 50% by weight filler;
about 7% to about 47% by weight virgin soap pellets;
about 3% to about 5% binder; and
at least one of a lubricant, glidant, dye, and fragrance;
wherein a ratio of virgin soap pellets to the anionic surfactant is from about 0.5:1 to about 2:1.

2. The compressed toilet brush composition of claim 1, wherein the ratio of virgin soap pellets to the anionic surfactant is from about 1:1 to about 1.5:1.

3. The compressed toilet brush composition of claim 2, wherein the ratio of the virgin soap pellets to the surfactant is about 1.2:1 to about 1.3:1.

4. The compressed toilet brush composition of claim 1, wherein the anionic surfactant is selected from Sodium Dodecylbenzenesulfonate, Sodium Cocoyl Isethionate, Sodium Olefin Sulphonate, and combinations thereof.

5. The compressed toilet brush composition of claim 1, wherein the filler selected from the group consisting of clays, sugars, salts, celluloses, and combinations thereof.

* * * * *